(12) United States Patent
Yoon et al.

(10) Patent No.: US 9,118,449 B2
(45) Date of Patent: *Aug. 25, 2015

(54) METHOD OF TRANSMITTING AND RECEIVING ACKNOWLEDGMENT SIGNAL IN A WIRELESS COMMUNICATION SYSTEM

(71) Applicant: LG ELECTRONICS INC., Seoul (KR)

(72) Inventors: Young Cheul Yoon, San Diego, CA (US); Li-Hsiang Sun, San Diego, CA (US); Sang Gook Kim, San Diego, CA (US); Suk Woo Lee, San Diego, CA (US); Shu Wang, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,023

(22) Filed: Nov. 18, 2014

(65) Prior Publication Data

US 2015/0071246 A1    Mar. 12, 2015

Related U.S. Application Data

(63) Continuation of application No. 14/302,319, filed on Jun. 11, 2014, now Pat. No. 8,917,694, which is a continuation of application No. 11/740,271, filed on Apr. 25, 2007, now Pat. No. 8,787,265.

(60) Provisional application No. 60/794,944, filed on Apr. 25, 2006, provisional application No. 60/885,388, filed on Jan. 17, 2007.

(51) Int. Cl.
*H04L 5/00* (2006.01)
*H04L 1/16* (2006.01)
(Continued)

(52) U.S. Cl.
CPC ............ *H04L 5/0055* (2013.01); *H04L 1/1607* (2013.01); *H04L 1/1887* (2013.01); *H04L 2001/0092* (2013.01)

(58) Field of Classification Search
CPC .... H04L 1/1607; H04L 1/1887; H04L 5/0005
USPC ........................................................ 370/329
See application file for complete search history.

(56) References Cited

U.S. PATENT DOCUMENTS 6,330,436 B1    12/2001 Zidel
6,574,211 B2    6/2003 Padovani et al.
(Continued)

FOREIGN PATENT DOCUMENTS

CN    1759575    4/2006
EP    1517499    3/2005
(Continued)

OTHER PUBLICATIONS

Qualcomm, "Detailed Description for Qualcomm's FL Proposal for HRPD REv. A Enhancement," C30-DOAH-20031013-205, Oct. 14, 2003.
(Continued)

*Primary Examiner* — Mark Rinehart
*Assistant Examiner* — Gbemileke Onamuti
(74) *Attorney, Agent, or Firm* — Lee, Hong, Degerman, Kang & Waimey

(57) ABSTRACT

A method of receiving an acknowledgement (ACK) signal from at least one access terminal (AT) in a wireless communication system is disclosed. More specifically, the method includes transmitting at least one packet via a packet data channel from an access network (AN), receiving at least one ACK signal from the at least one AT using same channelization resources, wherein each AT is assigned a code specific to each AT, and identifying the ACK signal corresponding to the transmitted packet from the received at least one ACK signal.

16 Claims, 2 Drawing Sheets

(51) Int. Cl.
*H04L 1/18* (2006.01)
*H04L 1/00* (2006.01)

(56) References Cited

U.S. PATENT DOCUMENTS

| | | | |
|---|---|---|---|
| 6,845,103 B1 | 1/2005 | Park | |
| 6,853,629 B2 | 2/2005 | Alamouti et al. | |
| 7,706,346 B2 | 4/2010 | Huo et al. | |
| 8,787,265 B2 * | 7/2014 | Yoon et al. | 370/329 |
| 2003/0095532 A1 | 5/2003 | Kim et al. | |
| 2003/0103557 A1 | 6/2003 | Dolwin | |
| 2003/0202561 A1 | 10/2003 | Tiedemann et al. | |
| 2005/0053038 A1 | 3/2005 | Kimura | |
| 2005/0250497 A1 | 11/2005 | Ghosh et al. | |
| 2006/0268720 A1 | 11/2006 | Rong et al. | |
| 2006/0268883 A1 | 11/2006 | Qian et al. | |
| 2007/0147329 A1 | 6/2007 | Soriaga et al. | |
| 2007/0217370 A1 | 9/2007 | Soong et al. | |
| 2007/0286226 A1 | 12/2007 | Yoon et al. | |
| 2008/0037664 A1 | 2/2008 | Yang et al. | |
| 2014/0293919 A1 | 10/2014 | Yoon et al. | |

FOREIGN PATENT DOCUMENTS

| | | |
|---|---|---|
| EP | 1545040 | 6/2005 |
| JP | 2004201340 | 7/2004 |
| JP | 2004363721 | 12/2004 |
| JP | 2005287070 | 10/2005 |
| JP | 2006518170 | 8/2006 |
| JP | 2009181759 | 8/2009 |
| KR | 10-2004-0106544 | 12/2004 |
| KR | 10-2005-0027679 | 3/2005 |
| KR | 10-2005-0057452 | 6/2005 |
| KR | 10-0918748 | 9/2009 |
| WO | 01/78269 | 10/2001 |
| WO | 0235735 | 5/2002 |
| WO | 2003104919 | 12/2003 |
| WO | 2004075442 | 9/2004 |
| WO | 2004075495 | 9/2004 |
| WO | 2004077920 | 9/2004 |

OTHER PUBLICATIONS

European Patent Office Application Serial No. 07746187.9, Search Report dated Oct. 21, 2013, 14 pages.

U.S. Appl. No. 14/724,393 Office Action dated Jun. 19, 2015, 34 pages.

Taiwan Intellectual Property Office Application Serial No. 096114723, Office Action dated Apr. 19, 2013, 7 pages.

* cited by examiner

| MUP Preamble | AT_A | AT_B | ... | AT_H |
|---|---|---|---|---|
| | 1 | 2 | ... | 8 |

METHOD OF TRANSMITTING AND RECEIVING ACKNOWLEDGMENT SIGNAL IN A WIRELESS COMMUNICATION SYSTEM

This application is a continuation of U.S. patent application Ser. No. 14/302,319, filed on Jun. 11, 2014, now U.S. Pat. No. 8,917,694, which is a continuation of U.S. patent application Ser. No. 11/740,271, filed on Apr. 25, 2007, now U.S. Pat. No. 8,787,265, which claims the benefit of U.S. Provisional Application Serial Nos. 60/794,944, filed on Apr. 25, 2006 and 60/885,388, filed on Jan. 17, 2007, the contents of which are all hereby incorporated by reference herein in their entirety.

BACKGROUND OF THE INVENTION

1. Field of the Invention

The present invention relates to a method of transmitting and receiving a signal, and more particularly, to a method of transmitting and receiving an acknowledgment signal in a wireless communication system.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

In a wireless communication system, it is important to devise schemes and techniques that increase the information rate and improve the robustness of a communication system under the harsh conditions of the wireless environment. To combat less-than-ideal communication conditions and/or to improve communication, various methods, including reducing transmission of unnecessary data, can be used to free up resources as well as promote more effective and efficient transmission.

SUMMARY OF THE INVENTION

Accordingly, the present invention is directed to a method of transmitting and receiving an acknowledgment signal in a wireless communication system that substantially obviates one or more problems due to limitations and disadvantages of the related art.

An object of the present invention is to provide a method of receiving an acknowledgement (ACK) signal from at least one access terminal (AT) in a wireless communication system.

Another object of the present invention is to provide a method of transmitting an acknowledgement (ACK) signal from at least one access terminal (AT) in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving an acknowledgement (ACK) signal from at least one access terminal (AT) in a wireless communication system includes transmitting at least one packet via a packet data channel from an access network (AN), receiving at least one ACK signal from the at least one AT using same channelization resources, wherein each AT is assigned a code specific to each AT, and identifying the ACK signal corresponding to the transmitted packet from the received at least one ACK signal.

In another aspect of the present invention, a method of transmitting an acknowledgement (ACK) signal from at least one access terminal (AT) in a wireless communication system includes receiving at least one packet via a packet data channel from an access network (AN), and transmitting an AT-specific ACK signal to the AN using same channelization resources shared by other ATs for transmitting respective ACK signals.

In a further aspect of the present invention, a method of receiving an acknowledgement (ACK) signal from at least one access terminal (AT) in a wireless communication system includes transmitting a multi-user packet (MUP) including a preamble and a plurality of packets arranged in sequential order which indicates an AT-specific code that corresponds to each AT, and receiving the ACK signal from the each AT, wherein the each AT corresponds to the AT-specific code.

Yet, in another aspect of the present invention, a method of transmitting an acknowledgement (ACK) signal from at least one access terminal (AT) in a wireless communication system includes receiving a multi-user packet (MUP) including a preamble and a plurality of packets arranged in sequential order which indicates an AT-specific code, and transmitting the ACK signal by the AT after decoding a packet from the plurality of packets which corresponds to the AT-specific code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
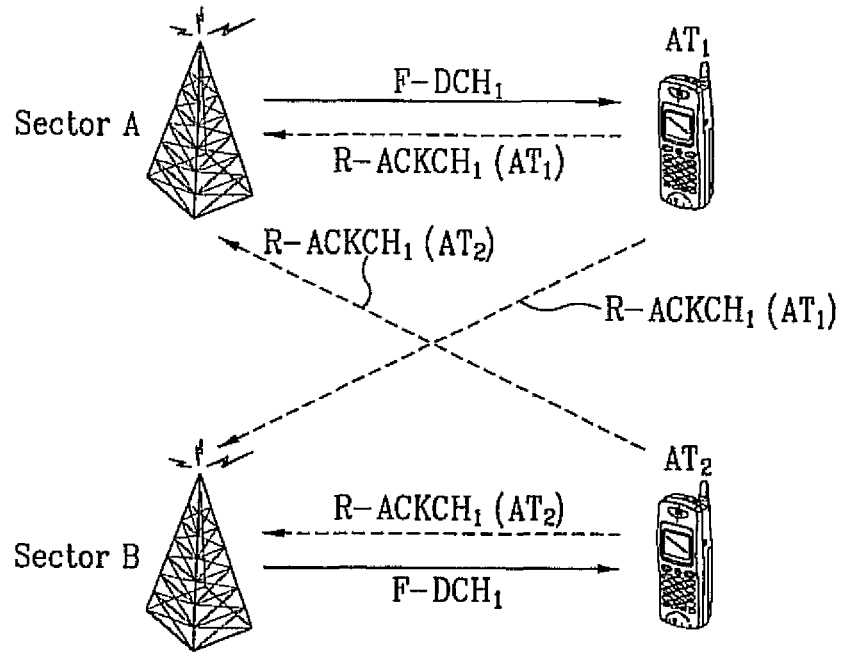
FIG. 1 is an exemplary diagram illustrating possible collision of ACKs sent from multiple ATs via shared channel.

Reference will now be made in detail to the preferred embodiments of the present invention, examples of which are illustrated in the accompanying drawings. Wherever possible, the same reference numbers will be used throughout the drawings to refer to the same or like parts.

The ultra mobile broadband (UMB) combines various aspects of code division multiple access (CDMA), time division multiplexing (TDM), LS-OFDM, orthogonal frequency division multiplexing (OFDM), and OFDM access (OFDMA) into a single air interface using sophisticated control and signaling mechanisms and advanced antenna techniques (e.g., multiple input, multiple output (MIMO) and space division multiple access (SDMA)). As a result, performance can be enhanced.

Among various advantageous, the UMB efficiently supports centralized access network. In the UMB, an access terminal (AT) maintains separate protocol stack for each base station (BS) or access network (AN) in the active set. The BSs are connected by an inter-AN interface. The inter-AN interface supports tunneling of layer 2 and/or layer 3 packets, session transfer, and other functions such as paging and neighbor discovery. However, the inter-AN interface need not support one BS/AN in control of connection state at another AN, interpretation/translation of tunneled packets by serving AN, or transfer of RoHC/ConnectionfRLP state. In addition, each cell can be a separate AN/BS.

Further, each BS in the active set uses a separate data route. In other words, there is no need to transfer RLP and header compression state between BSs. In addition, traffic flow between the BS and the AT can be tunneled through the serving BS. Here, this supports fast and seamless re-pointing between cells/sectors.

Each BS in the active set can use a separate personality. That is, there can be seamless handoff across air interface revision boundaries. Moreover, signaling message of protocols between a BS and an AT can be tunneled through the serving BS. Here, the BS which acts as a tunnel need not interpret the tunneled messages. Moreover, there is no protocol conversion between BSs.

Regarding connection maintenance, the BS does not have to maintain connection state of other BSs in the active set, which means that the BS does not need to synchronize connection state across BSs.

In the UMB, reverse link allows many cast. That is, the AT can send a pacet once over the air and address it to multiple BSs or ANs. Moreover, UMB layering reduces the number of protocols in the data path.

In a wireless communication system, such as the UMB, various design of high speed packet air interfaces using automatic request (ARQ) or a hybrid ARQ (H-ARQ) over the forward link (FL) and reverse link (RL) can be implemented. With respect to the FL, after a base station (BS) sends a packet on the FL to an access terminal (AT), the AT can respond with a positive acknowledgement (ACK) or a negative acknowledgement (NAK) indicating whether the packet is successfully received or not. The ACK or NAK is typically indicated using a RL ACK channel.

Hereinafter, the BS can also be referred to as an access network, a node, Node B, serving BS, and a network. Furthermore, the AT can also be referred to as a mobile station, a terminal, mobile subscriber station, and a terminal station. The discussions to follow are applicable to multi-user packet (MUP).

In 1xEV-DO (1x Evolution Data Optimized) system, the ACK/NAK can be sent via a dedicated channel. That is, the ACK and/or NAK signal is sent on a dedicated RL ACK and/or NAK channel.

With continuing developments in the systems features and capabilities, such as the LIMB, with respect to the RL ACK channel, it is possible to use a shared (or common) ACK channel among RL terminals. The AT can use a particular resource (e.g., frequency tones) reserved for the ACK for a particular FL packet channel. For example, if there is only one AT scheduled at a time in a time division multiple access (TDMA) fashion, then the BS of the serving cell/sector can expect to receive at most one RL ACK from the scheduled AT. Here, this ACK is sent over the reserved route.

Furthermore, assume that there are two (2) ATs, for example. If these two (2) ATs can be scheduled simultaneously, then two (2) common ACK channels can be used to send ACK to each of the two (2) corresponding FL packets distinctly. That is, the two (2) ACK channels could use two (2) distinct set of frequency tones to provide orthogonality and no cross-interference.

However, there can be difficulties associated with the shared or common RL ACK channel. More specifically, since the resources are shared, collisions can occur with ACKs sent from multiple ATs. FIG. 1 is an exemplary diagram illustrating possible collision of ACKs sent from multiple ATs via shared channel. As illustrated, ACK sent via an acknowledgement channel (ACKCH) from each AT (i.e., $AT_1$ and $AT_2$) are sent on $ACKCH_1$ or put differently, reverse-$ACKCH_1$ (R-$ACKCH_1$). Since the shared ACKCH serves ACK sent to two (2) different sectors, collision can occur between the ACK sent from $AT_1$ and the ACK sent from $AT_2$.

As discussed, the shared RL ACK channel can experience collision. That is, it is possible that another AT may mistakenly determine that it is being scheduled. Consequently, both the "mistaken" AT(s) and "actually scheduled" AT can transmit on the same common ACK channel and, collide. In such a situation, the receiver at the BS would greatly reduce the reliability of the ACK channel from the intended AT. Here, there is a possibility of interference from other ATs elsewhere transmitting in some or all of the same tones.

To address the possible collision that can take place in the shared RL ACK channel by a mistaken AT, a physical layer waveform of the ACK signal (at the AT transmitter) can be encoded with a unique and/or AT-specific code, For example, the ACK signal can be encoded with a scrambling code unique to the AT. Here, the AT-specific code can also be referred to as a medium access control (MAC) identification (ID). Moreover, the AT-specific code can be defined in the preamble to include the position of the AT in a multi-user packet (MUP). In addition, the AT-specific code can be a scrambling code.

Figures 2, 3:
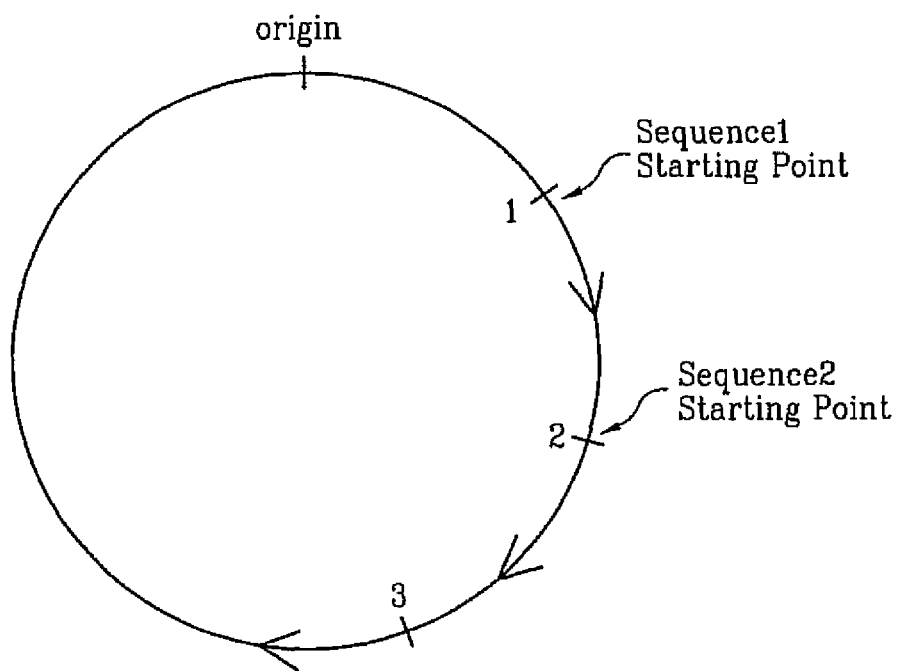
FIG. 2 is an exemplary diagram illustrating different starting points for each sequence.
FIG. 3 is an exemplary diagram illustrating a plurality of ATs using different codes in a MUP.

In a 1xEV-DO system, the long pseudo noise (PN) sequence can be used. That is, the offset for each AT can be changed so as to make each AT unique and distinguishable. This can be made possible since the sequence is long. For example, FIG. 2 is an exemplary diagram illustrating different starting points for each sequence. Referring to FIG. 2, different offset is provided. Sequence 1 starts at point 1, Sequence 2 starts at a different point further along in the clock-wise direction, and so on. This way, as discussed, each sequence can be made unique and distinguishable.

In addition, other sequences can be used as well, such as Walsh codes which could be assigned at call start up. The BS scheduler knows which AT has been scheduled and the scrambling code it is expecting. Hence, when the received scrambling code differs, then the scheduler knows that there has been an error. Even if there are two more signals sending an ACK, it may be possible to detect the desired AT's ACK response given the encoding.

Here, since the BS scheduler knows which user was scheduled, the receiver would know the physical layer waveform it can expect to see/receive, especially since this physical layer waveform is AT specific. Further, by encoding ACK signals, this can also allow for multiplexing of ACK signals to provide greater frequency diversity. This assumes the availability of one or more tones for ACK signaling.

If the ACK is sent in an AT-specific environment, interference and/or collision is not likely to occur and is absent of orthogonality. However, with sector-specific system, interferences and/or collisions can occur between sectors (as illustrated with respect to FIG. 1). Here, however, interferences and/or collisions do not take place within the sector, only between sectors.

As such, in the shared channel environment, it is possible that another AT (AT_B) from a different sector (Sector B) may use the same RL resources as that for the AT of interest (AT_A) in the sector of interest (Sector A). In this case, as above, the ACK channel of AT_A and that for AT_B can collide when they are transmitted at the same time over the same resources. For example, the ATs from different sectors may transmit using the same RL orthogonal frequency division multiplexing (OFDM) resources resulting in collision.

To address the possible collision that can take place in the shared RL ACK channel due to sharing of the same RL resources from ATs of different cell/sectors, a physical layer frame of the ACK signal can be encoded using a sector-specific scrambling code.

For example, in Ultra-Mobile Broadband (UMB), each AT can be assigned two (2) discrete Fourier transform (DFT) codes where the length of each is 16. The ACK can be sent by sending energy on one of the DFT code. Here, nothing is sent over the other DFT code. Moreover, the NAK can be sent by having no energy sent on either DFT code.

A problem that can arise here is that the same DFT codes and OFDM resources are re-used in adjacent sectors and, hence, collisions can occur which become more acute when the interfering AT is closer to the sector-boundary region (e.g., poor geometry AT). In this case, each AT in a particular sector (e.g. Sector A) can use a sector-specific scrambling code to randomize the mapping of the DFT code to the OFDM sub-carriers. This randomized mapping can be achieved by using a sector-specific interleaver and/or an interleaver controlled by a sector-specific scrambling code.

Further to resolving a collision problem, the channelization resources of an ACKCH can be made variable. Typically, the channelization resources of the ACKCH are fixed regardless of the data rate of its corresponding packet data channel (PDCH). Instead of fixing the amount of resources assigned to an ACKCH, the amount of resources assigned to an ACKCH can be made variable according to the data rate of the PDCH. The benefit of this approach is that as the PDCH data rate increases, the value of having a more reliable ACKCH increases. An ACKCH using more resources can achieve greater frequency diversity and, hence, greater reliability.

In addition, making variable the resources assigned to the ACKCH can reduce the likelihood of ACKCH decoding failure which introduces other problems such as unnecessary re-transmissions (when an ACK is decoded incorrectly as a NAK) and/or the absence of a needed re-transmission (when a NAK is decoded incorrectly as an ACK).

Further to resolving the collision problem, instead of using the PDCH data rate, the PDCH data transmission format and/or number of channelization resources can be used (e.g., channelization codes in CDMA or tiles in OFDM used by the PDCH).

With respect to the UMB, an AT is restricted to using one R-ACKCH resource unit consisting of two DFT codes over four sub-tiles (where each sub-tile is located typically as far as apart as possible in the frequency domain to ensure frequency diversity). If there are leftover R-ACKCH resources, the ATs can use more than one R-ACKCH resource.

The structure of the UMB includes a preamble and 25 physical frames. There are eight (8) OFDM symbols per preamble and physical frame. As for the preamble, first 5 OFDM symbols are carried by the preamble.

In addition, sector-specific hopping of the R-ACKCH and/or sub-tiles among different OFDM resources can take place. For example, there are a set of ACKCH's (16 DFT codes) hop in a sector-specific pseudo-randomized fashion from one frame to another frame.

Further, scrambling of the sub-tile locations with each tile can take place. Currently, they are set to the bottom half of a tile. Have them randomly assigned within the tile to minimize collisions.

In addition, multi-user packets (MUPs) is an existing air-interface feature in 1xEV-DO which allows multiple ATs to be scheduled using a common transmission format and shared resources (time, frequency and/or space). With MUP, the ATs, which successfully decode an MUP packet, can send an ACK over a dedicated channel and not over the shared channel. Otherwise, it sends nothing. With respect to using the shared ACK channel, as discussed, it is possible for multiple ATs to transmit an ACK over the shared ACK channel and, hence, collision can occur.

To address possible difficulties associated with collision that can take place with respect to MUP, the sequencing information implicit in a MUP can be used. More specifically, the ATs in a MUP can be sequenced. For example, in 1xEV-DO, the header and information bits for each user are ordered in a sequential fashion such that up to eight (8) ATs can be ordered. The ACK channel can be modulated one of eight orthogonal (or non-orthogonal but distinct) codes. For example, the eight length-8 Walsh codes can be mapped to indicate the ACK of each of the up to eight ATs.

FIG. 3 is an exemplary diagram illustrating a plurality of ATs using different codes in a MUP. Referring to FIG. 3, each AT uses a prescribed code which is different from the prescribed code used by other ATs. Here, AT_A uses scrambling code sequence 1 while AT_B uses scrambling code sequence 2, and so on.

Further, the encoding can be performed in the time domain, frequency domain, or some combination of the two. In the time domain-only solution, there would need to be at least eight instances of the ACK bit transmission.

Consider the above example requiring eight (8) ACKs. In the frequency-domain-only solution, there would need to be at least eight tones to allow for multi-code CDMA. In the combined time and frequency solution, some mixture of the two can be used. For example, if there are two transmission instants (one repetition), then at least 4 frequency tones would be needed.

The difficulties discussed associated with the shared RL ACK channel can also be applied to the RL for scheduled ATs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a plurality of acknowledgement (ACK)/negative acknowledgement (NAK) signals at a base station (BS) in a wireless communication system utilizing an orthogonal frequency division multiplexing (OFDM) scheme, the method comprising:

transmitting, by the BS, a plurality of data packets to a plurality of mobile stations;

receiving, by the BS, a plurality of first ACK/NAK signals from the plurality of mobile stations, wherein the plurality of first ACK/NAK signals are spread on a first set of orthogonal frequency tones using a plurality of sequences corresponding to the plurality of mobile stations;

receiving, by the BS, a plurality of second ACK/NAK signals from the plurality of mobile stations, wherein the plurality of second ACK/NAK signals are spread on a second set of orthogonal frequency tones, wherein the plurality of second ACK/NAK signals carry the same information as the plurality of first ACK/NAK signals; and determining, by the BS, whether the plurality of data packets are successfully received by the plurality of mobile stations based on the plurality of first ACK/NAK signals and the plurality of second ACK/NAK signals;

wherein the first set of orthogonal frequency tones are different from the second set of orthogonal frequency tones over two transmission instants.

2. The method of claim 1, wherein the plurality of sequences are generated from a single sequence.

3. The method of claim 1, wherein the plurality of sequences are a plurality of scrambling sequences.

4. The method of claim 3, wherein the plurality of scrambling sequences are pseudo noise sequence codes.

5. A method of transmitting an acknowledgement (ACK)/negative acknowledgment (NAK) signal at a mobile station in a wireless communication system utilizing an orthogonal frequency division multiplexing (OFDM) scheme, the method comprising:

receiving, by the mobile station, a data packet from a base station (BS); and transmitting, by the mobile station, a first ACK/NAK signal to the BS via a first set of orthogonal frequency tones; and transmitting, by the mobile station, a second ACK/NAK signal to the BS via a second set of orthogonal frequency tones;

wherein the first ACK/NAK signal and the second ACK/NACK signal carry same information and correspond to the data packet, wherein the first ACK/NAK signal is spread on the first set of orthogonal frequency tones and the second ACK/NACK signal is spread on the second set of orthogonal frequency tones using a sequence assigned to the mobile station among a plurality of sequences;

wherein the first set of orthogonal frequency tones are different from the second set of orthogonal frequency tones over two transmission instants.

6. The method of claim 5, wherein the plurality of sequences are generated from a single sequence.

7. The method of claim 5, wherein the plurality of sequences are a plurality of scrambling sequences.

8. The method of claim 7, wherein the plurality of scrambling sequences are pseudo noise sequence codes.

9. A base station (BS) configured to receive a plurality of acknowledgement (ACK)/negative acknowledgement (NAK) signals in a wireless communication system utilizing an orthogonal frequency division multiplexing (OFDM) scheme, the BS comprising:

a transmitter configured to transmit a plurality of data packets to a plurality of mobile stations;

a receiver configured to receive:
a plurality of first ACK/NAK signals from the plurality of mobile stations, wherein the plurality of first ACK/NAK signals are spread on a first set of orthogonal frequency tones using a plurality of sequences corresponding to the plurality of mobile stations; and a plurality of second ACK/NAK signals from the plurality of mobile stations, wherein the plurality of second ACK/NAK signals are spread on a second set of orthogonal frequency tones, and the plurality of second ACK/NAK signals carry the same information as the plurality of first ACK/NAK signals; and a processor configured to determine whether the plurality of data packets are successfully received by the plurality of mobile stations based on the plurality of first ACK/NAK signals and the plurality of second ACK/NAK signals;

wherein the first set of orthogonal frequency tones are different from the second set of orthogonal frequency tones over two transmission instants.

10. The BS of claim 9, wherein the plurality of sequences are generated from a single sequence.

11. The BS of claim 9, wherein the plurality of sequences are a plurality of scrambling sequences.

12. The BS of claim 11, wherein the plurality of scrambling sequences are pseudo noise sequence codes.

13. A mobile station configured to transmit an acknowledgement (ACK)/negative acknowledgment (NAK) signal in a wireless communication system utilizing an orthogonal frequency division multiplexing (OFDM) scheme, the mobile station comprising:

a receiver configured to receive a data packet from a base station (BS); and a transmitter configured to transmit:
a first ACK/NAK signal to the BS via a first set of orthogonal frequency tones; and
a second ACK/NAK signal to the BS via a second set of orthogonal frequency tones;

wherein the first ACK/NAK signal and the second ACK/NACK signal carry same information and correspond to the data packet;

wherein the first ACK/NAK signal is spread on the first set of orthogonal frequency tones and the second ACK/NACK signal is spread on the second set of orthogonal frequency tones using a sequence assigned to the mobile station among a plurality of sequences; and wherein the first set of orthogonal frequency tones are different from the second set of orthogonal frequency tones over two transmission instants.

14. The mobile station of claim 13, wherein the plurality of sequences are generated from a single sequence.

15. The mobile station of claim 13, wherein the plurality of sequences are a plurality of scrambling sequences.

16. The mobile station of claim 15, wherein the plurality of scrambling sequences are pseudo noise sequence codes.

* * * * *